United States Patent [19]

Greene

[11] Patent Number: 5,590,853
[45] Date of Patent: Jan. 7, 1997

[54] AIRCRAFT CONTROL SYSTEM

[75] Inventor: Leonard M. Greene, Scarsdale, N.Y.

[73] Assignee: Safe Flight Instrument Corporation, White Plains, N.Y.

[21] Appl. No.: 829,256

[22] Filed: Feb. 3, 1992

[51] Int. Cl.$^6$ .............................. G05D 1/08; G05D 1/10; B64C 9/00
[52] U.S. Cl. .............................. 244/184; 244/185; 244/87
[58] Field of Search .................................. 244/181, 183, 244/184, 185, 87

[56] References Cited

U.S. PATENT DOCUMENTS

| | | |
|---|---|---|
| 1,909,682 | 5/1933 | Jenkins . |
| 1,982,262 | 11/1934 | Meinert . |
| 2,029,700 | 2/1936 | Boykow . |
| 2,197,890 | 4/1940 | Koster . |
| 2,246,555 | 6/1941 | Underwood . |
| 2,662,402 | 12/1953 | Ince, Jr. et al. . |
| 2,775,124 | 12/1954 | Gardner et al. . |
| 2,987,276 | 6/1961 | Osder et al. .............................. 244/184 |
| 3,082,622 | 3/1963 | Andrew .................................. 244/181 |
| 3,285,067 | 11/1966 | Greene . |
| 3,327,972 | 6/1967 | Greene . |
| 3,361,392 | 1/1968 | Doniger et al. .......................... 244/184 |
| 3,522,729 | 8/1970 | Miller . |
| 3,534,600 | 10/1970 | Eichweber et al. . |
| 3,537,307 | 11/1970 | Pliha . |
| 3,594,553 | 7/1971 | McElroy . |
| 3,814,912 | 6/1974 | Manke et al. . |
| 3,930,610 | 1/1976 | Hache . |
| 4,012,713 | 3/1977 | Greene et al. . |
| 4,046,341 | 9/1977 | Quinlivan ................................ 244/181 |
| 4,079,905 | 3/1978 | Greene . |
| 4,094,479 | 6/1978 | Kennedy, Jr. ............................ 244/184 |
| 4,230,290 | 10/1980 | Townsend et al. ...................... 244/1 R |
| 4,814,764 | 3/1989 | Middleton . |
| 4,908,619 | 3/1990 | Bala et al. .............................. 244/187 |
| 5,060,889 | 10/1991 | Nadkarni et al. ....................... 244/183 |

*Primary Examiner*—Andres Kashnikow
*Assistant Examiner*—Lissi Mejica
*Attorney, Agent, or Firm*—David E. Dougherty

[57] ABSTRACT

An aircraft control system for computing a yaw compensated angle of attack is disclosed. The system includes an angle of attack sensor for generating a signal which represents an aircraft's angle of attack as determined by an angle of attack vane and a transverse accelerometer for generating a signal in response to the lateral acceleration of the aircraft. A summing device sums the two signals to thereby provide a yaw compensated angle of attack signal. The system may also include a rudder deflection sensor for generating a signal which represents the deflection of an aircraft's rudder. The rudder deflection signal is then subtracted from the yaw compensated angle of attack in the summing device. A stall warning system incorporating the yaw compensation system includes a stall warning computer for comparing the yaw compensated angle of attack signal to a predetermined value. The stall warning computer then triggers a stall warning device when the yaw compensated angle of attack signal exceeds the predetermined value.

9 Claims, 1 Drawing Sheet

AIRCRAFT CONTROL SYSTEM

BACKGROUND OF THE INVENTION

This invention relates to an aircraft control system and more particularly to a system for computing a yaw compensated angle of attack.

Modern commercial aircraft typically include a stall warning system which is triggered by the angle of attack of the aircraft as determined by an angle of attack vane. Such aircraft also include an integrated airspeed control, command and display system which aid a pilot during take-off, climb out, let down, approach, landing and go-around maneuvers. Such integrated systems are also based on various parameters relating to flight conditions including the aircraft's angle of attack as determined by an angle of attack vane.

It is customary to locate these angle of attack vanes on the sides of an aircraft's fuselage. However, these side mountings may lead to a problem when the aircraft is flown in yawed flight. As used herein, the term "yaw" refers to the condition of an aircraft when the longitudinal axis of the aircraft is angled to the left or right of the direction of flight. Thus, the yaw angle or side slip angle refers to the angular difference between the aircraft's heading and the aircraft's direction of flight. Under such circumstances, i.e., when an aircraft is flown in a yawed condition, the position of the angle of attack sensing vane will be determined by the local air flow passing the vane. The angle of attack vanes are usually located so that the changes in the local air flow at the vane cause the vane to pivot in accordance with the angle of attack. The local air flow at these fuselage locations are determined to a lesser extent by the yaw of the aircraft so that the indicated angle of attack is actually a function of both the angle of attack and the yaw.

In order to overcome the problem associated with yaw, a yaw vane has been used to supply a correction factor. A yaw vane is a movable vane, similar to an angle of attack vane, but which is typically mounted on the outside of the fuselage along the aircraft's centerline. The vane is mounted for rotation about the aircraft's vertical axis so as to align with the airflow past the aircraft. Thus, the change in position of the vane when the aircraft enters a yaw condition is proportional to the sideslip angle. However, the addition of a yaw vane on the exterior of an aircraft is undesirable and is complicated because of location, icing, reliability and cost. Furthermore, it is difficult to find locations for dual installations of a yaw vane on the exterior of an aircraft.

Therefore, there appears to be a need in the aircraft control art for an improved control system which provides a yaw compensated angle of attack signal and at the same time eliminates any need for an externally mounted yaw vane.

SUMMARY OF THE INVENTION

In essence, a yaw compensated angle of attack system according to the present invention includes an angle of attack sensor such as an angle of attack vane and means for generating a signal in response to the position of the angle of attack vane. The system also includes a transverse accelerometer or pendulum and means for generating a signal in response to the lateral acceleration of an aircraft. Means are also provided for summing these two signals to thereby provide a signal which represents the yaw compensated or true angle of attack.

A preferred embodiment of the invention contemplates a stall warning system which combines the yaw compensated angle of attack system with means for warning a pilot when the yaw compensated angle of attack exceeds a predetermined value. That system may also include means for producing a signal representing the deflection of an aircraft's rudder and means for subtracting the rudder deflection signal from either the aircraft's apparent angle of attack signal or from the yaw compensated angle of attack signal. Means are also provided for warning a pilot when the yaw compensated angle of attack exceeds a predetermined value.

The invention will now be described in connection with the accompanying drawings wherein like reference numerals have been used to define like parts.

DETAILED DESCRIPTION OF THE PREFERRED EMBODIMENTS

As a plane flies through the air, the wings must have a certain minimum pitch relative to the direction of flight in order to create the lift for supporting the weight of the plane. This pitch or angle between the wing center line and the direction of flight is known as the angle of attack. Since a wing develops greater lift at higher speeds, the necessary angle of attack at higher speeds is less than at lower speeds. There is therefore, an inverse relationship between the angle of attack and air speed for any particular plane.

Angle of attack becomes critically important at slow speeds when the aircraft is relatively close to the ground since every airplane has a certain angle of attack beyond which it goes into a stall. Every plane has a corresponding stall speed which will vary depending on loading, turning and banking conditions at the stall angle. However, the angle of attack provides a consistent indication of the aircraft's lift characteristics regardless of the payload or turning angle of the plane. For this reason, stall warning systems are typically based on an aircraft's angle of attack as measured by an angle of attack vane. Thus, a more accurate determination of the aircraft's angle of attack may contribute to the safety of the aircraft.

Figure 2:
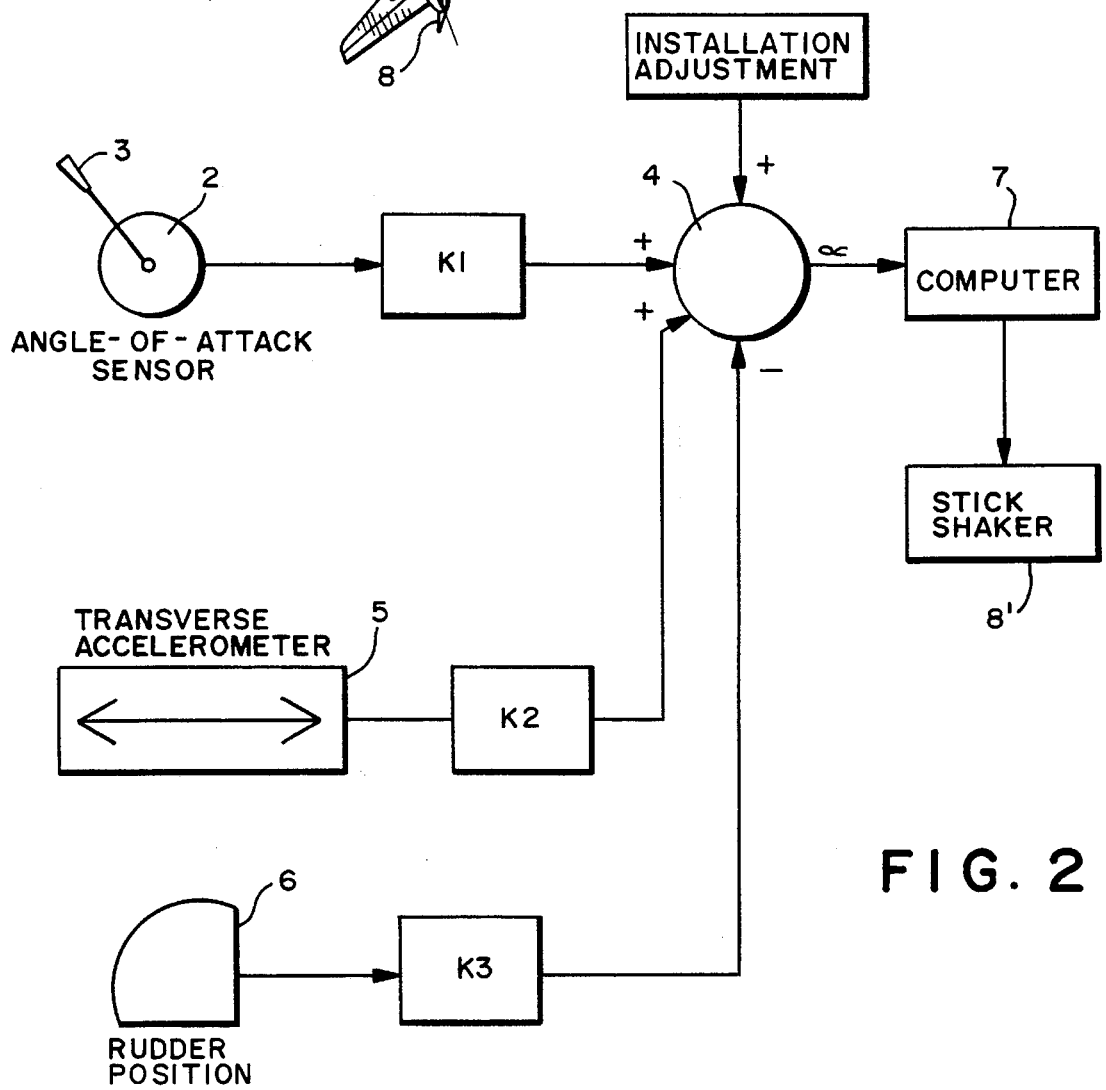
FIG. 2 is a schematic drawing which illustrates the basic features of the invention.

An angle of attack sensor 2 and vane 3 as shown schematically in FIG. 2 is typically used for measuring an aircraft's angle of attack. Such vanes are mounted on the exterior of an aircraft's fuselage on one side of the aircraft and are pivotally movable in response to changes in the airplane's angle of attack. A more detailed description of such vanes are included in the U.S. patents of Townsend et al., U.S. Pat. No. 4,230,290, and of Eichweber et al., U.S. Pat. No. 3,534,600, each of which is incorporated herein by reference.

Figure 1:
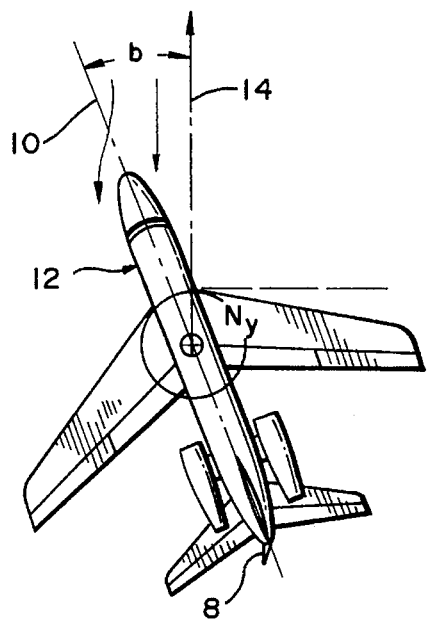
FIG. 1 is a schematic representation of an aircraft showing a sideslip angle b formed between the longitudinal axis of the aircraft and the direction of flight of the aircraft.

As mentioned under Background of the Invention, the angle of attack indication of such sensors may vary or give a false indication when an aircraft is flown in a yawed condition. For example, as shown in FIG. 1, the generation of a yawing moment $N_y$, typically by deflection of the aircraft's rudder 8, causes the aircraft's longitudinal axis, designated by a line 10 of an aircraft 12, to diverge from the direction of flight of the aircraft 12 which is shown by an arrow or direction vector 14. The intersection of the aircraft's longitudinal axis 10 and the aircraft's direction of flight 14 at the aircraft's center of gravity, forms an aircraft side slip angle b.

At times it is necessary to yaw an aircraft to generate a selected slip angle. This is usually done to reduce altitude in a hurry without building up excessive airspeed. For example, during a landing approach (in FIG. 1), the aircraft 12 is being flown in a crabbed condition along the path (course) 14 of the aircraft. For example, during a landing approach, the aircraft 12 approach may be flown in a crabbed or yawed condition so that the path (course) 14 of the aircraft 12 is directly in line with the runway. In this manner, the longitudinal axis 10 of the aircraft 12 forms a yaw angle or crab angle (b) with the path 14 (course) of the aircraft over the ground. Just prior to touchdown, the pilot aligns (yaws) the longitudinal axis of the aircraft 12 with the runway by deflection of the rudder 8 to the right.

In essence, the only lateral forces that can be applied to an aircraft in flight are the aerodynamic forces generated by yawed flight and the force due to rudder deflection. The sum of these lateral forces must be equal to the mass times lateral acceleration where the lateral acceleration includes a component due to gravity. Accordingly, a fuselage mounted lateral accelerometer (pendulum angle) will be responsive to yawed flight conditions and rudder deflection. In addition, the values of the lateral accelerometer angle per angle of yaw and per angle of rudder deflection are fixed by the aircraft's aerodynamic dimensions. Therefore, a stall warning computer may be used to compute a signal which represents the yaw angle from signals responsive to the lateral acceleration angle and the rudder angle.

Prescribing the angle of attack and the angle of yaw for an aircraft fixes the direction of the aerodynamic force vector on that aircraft. In free flight, a pendulum mounted to the aircraft will assume the same angle as the projection of the aerodynamic force vector on a plane normal to the axis of rotation of the pendulum.

For a pendulum mounted on a longitudinal axis that angle is a result of two components; namely, downward acceleration (in the frame of reference of the aircraft) and the side acceleration. In other words, the angle of the pendulum is a result of two composites; namely, the lift force and the side force. Since the ratios of these two forces are uniquely determined by the angle of yaw, a pendulum so mounted will be responsible only to the yaw angle of an aircraft. This pendulum can be used as a yaw compensation for angle of attack measurement because the other variable, the lift component, is uniquely determined by the angle of attack. Accordingly, a measuring system for angle of attack comprising an angle of attack vane and a laterally moving pendulum can be used to compute the yaw corrected angle of attack.

The computed yaw compensation includes first order effects of the parameters involved. This is considered justified because the yaw compensation is, in itself, already a second order effect.

In the practice of the present invention, a transverse accelerometer serves the same purpose as and is the equivalent of a pendulum which is mounted on the longitudinal axis of the aircraft. For example, in a preferred embodiment of the invention, a piezoresistive accelerometer of a type which is available from Safe Flight Instrument Corporation of White Plains, N.Y., the assignee of the present invention, was used. That accelerometer comprises a micromachined silicon mass suspended from multiple beams to a silicon frame. Piezoresistors located in the beams change their resistance as the motion of the suspended mass changes the strain in the beams. Silicon caps on the top and bottom of the device are added to provide over-range stops and unusually high shock resistance and durability. Such structures also include built-in damping and are available in standard ranges.

A yaw compensated angle of attack system in accordance with the present invention includes the angle of attack sensor 2 and the angle of attack vane 3, as shown in FIG. 2. The vane 3 is generally symmetrical and mounted on the exterior of one side of the fuselage in a manner which will be well understood by those skilled in the art. The vane 3 is constructed and arranged to respond to any change in the direction of the fluid stream or air flow local to the vane and adjacent to the outer surface of an aircraft's fuselage. For example, the air flow will maintain the vane in a horizontal or level position with respect to air flow and the rotation of its shaft will cause the angle of attack sensor to generate a signal which represents that aircraft's apparent angle of attack, i.e., the angle which is based on the airflow immediately adjacent to the fuselage of the aircraft.

The angle of attack sensor 2 may be of the type which is disclosed in the aforementioned patent of Eichweber et al. As disclosed therein, the angle of attack sensor includes a vane or drag member, a shaft operatively connected to the vane and is adapted to rotate in response to any torque which may derive from aerodynamic or drag forces acting on the vane. Means are also provided for generating an output signal in response to any rotary movement of the shaft. Means may also be provided to control the damping of the rotary movement in response to aircraft speed.

When an aircraft is flown in yawed flight, as shown in FIG. 1, the air flow across the angle of attack vane may be deflected and adversely affect the signal representing the aircraft's angle of attack. For example, if the plane 12 is flown in yawed flight, the nose of the aircraft would partially block the airflow along the left side of the aircraft and across an angle of attack vane which is mounted on that side of the aircraft. Under such conditions, the angle of attack vane may give an erroneous reading. When the plane 12 is flown as illustrated, the air flow along the right side of the aircraft may also be disturbed when it strikes a forward part of the aircraft and therefore produce an erroneous indication of the angle of attack.

The operation of the yaw compensated angle of attack system in accordance with the present invention will now be described in connection with FIG. 2. As shown therein, the angle of attack sensor 3 generates a signal in response to the position of the angle of attack vane 2. That signal, which is multiplied by a constant $K_1$, represents the aircraft's angle of attack as indicated by its angle of attack vane 2 and is fed to summing device 4. A second signal or yaw signal is generated by a transverse accelerometer 5 in response to the yaw of the aircraft. The yaw signal is multiplied by a constant $K_2$ and fed to the summing device 4. The summing device 4 adds the two signals and produces a signal $\alpha$ which represents the yaw compensated angle of attack.

In one embodiment of the invention, means 6 are provided for generating a signal indicating the amount of deflection of the aircraft's rudder. That signal is multiplied by a constant $K_3$ and subtracted from the yaw compensated angle of attack signal by the summing device 4.

The signal $\alpha$ is fed to a stall warning computer 7. Then, if the aircraft's yaw compensated angle of attack exceeds a stall warning reference signal (not shown), this indicates that the aircraft is in or near stall and a stick shaker alert should be given by a stall warning device 8'. For example, a yaw compensated angle of attack system as disclosed herein might be incorporated in a stall warning system of the type disclosed in the U.S. patent of Bala et al., U.S. Pat. No. 4,908,619, which is incorporated herein by reference. As incorporated therein, a yaw compensated angle of attack signal produced by the present system would be substituted for the angle of attack signal in the patent disclosure.

An installation adjustment means 9 is provided to compensate for variations between aircraft. It should also be recognized that the selection of the constants $K_1$–$K_3$ will be based on the aircraft's design parameters as will be well understood by those who are skilled in the aircraft controls art.

While the invention has been described in connection with a preferred embodiment, it should be recognized that changes and modifications can be made without departing from the scope of the appended claims.

What is claimed is:

1. A yaw compensated angle of attack system comprising means including an angle of attack sensor for generating a signal which is indicative of an aircraft's apparent angle of attack, means including a transverse accelerometer for generating a signal which is indicative of the yaw angle of the aircraft, means for summing said signals to thereby produce a signal which indicates a yaw compensated angle of attack and means for warning a pilot when the yaw compensated angle of attack exceeds a predetermined value.

2. A yaw compensated angle of attack system comprising means including an angle of attack sensor for generating a signal which is indicative of an aircraft's apparent angle of attack, means including a transverse accelerometer for generating a signal which is indicative of the yaw angle of the aircraft, means for producing as signal which is indicative of the aircraft's rudder deflection and means for subtracting the rudder deflection signal from the signal which is indicative of the yaw angle of the aircraft, means for summing said signals to thereby produce a signal which indicates a yaw compensated angle of attack and means for warning a pilot when the yaw compensated angle of attack exceeds a predetermined value.

3. A stall warning system for an aircraft comprising:

means including an angle of attack vane for generating a signal representing the aircraft's apparent angle of attack;

means including a lateral accelerometer for producing a signal representing the aircraft's angle of yaw;

means for summing said signals to thereby produce a signal representing the aircraft's yaw compensated angle of attack;

means for producing a signal representing the deflection of the aircraft's rudder;

and means for subtracting the rudder deflection signal from the signal representing the aircraft's yaw compensated angle of attack; and, means for warning a pilot when the yaw compensated angle of attack signal minus the rudder deflection signal exceeds a predetermined value.

4. A method for determining the yaw compensated angle of attack of an aircraft comprises the steps of:

providing an angle of attack vane for determining an aircraft's apparent angle of attack and producing a signal in response to the air flow across the angle of attack vane;

providing a transverse accelerometer and producing a signal in response to a force affecting the accelerometer;

summing the signals to thereby provide a signal which represents the yaw compensated angle of attack of the aircraft, producing a signal representing the deflection of the aircraft's rudder and subtracting that signal from the signal representing the apparent angle of attack; and, providing a warning to a pilot when the yaw compensated angle of attack signal minus the rudder deflection signal exceeds a predetermined value.

5. A stall warning system for an aircraft comprising:

means including an angle of attack vane for generating a signal representing the aircraft's apparent angle of attack;

means including a lateral accelerometer for producing a signal representing the aircraft's angle of yaw;

means for summing said signals to thereby produce a signal representing the aircraft's yaw compensated angle of attack; and, means for warning a pilot when the yaw compensated angle of attack signal exceeds a predetermined value.

6. A stall warning system for an aircraft comprising:

means including an angle of attack vane for generating a signal representing the aircraft's apparent angle of attack;

means including a lateral accelerometer for producing a signal representing the aircraft's angle of yaw;

means for producing a signal representing the deflection of the aircraft's rudder;

and means for subtracting the rudder deflection signal from the signal representing the aircraft's angle of yaw;

means for summing said signals to thereby produce a signal representing the aircraft's yaw compensated angle of attack; and, means for warning a pilot when the yaw compensated angle of attack signal exceeds a predetermined value.

7. A method for determining the yaw compensated angle of attack of an aircraft comprising the steps of:

providing an angle of attack vane for determining an aircraft's apparent angle of attack and producing a signal in response to the air flow across the angle of attack vane;

providing a transverse accelerometer and producing a signal in response to a force affecting the accelerometer; and summing the signals to thereby provide a signal which represents the yaw compensated angle of attack of the aircraft and warning a pilot when the yaw compensated angle of attack signal exceeds a predetermined value.

8. A method for determining the yaw compensated angle of attack of an aircraft comprising the steps of:

providing an angle of attack vane for determining an aircraft's apparent angle of attack and producing a signal in response to the air flow across the angle of attack vane;

providing a transverse accelerometer and producing a signal in response to a force affecting the accelerometer;

producing a signal representing the deflection of the aircraft's rudder and subtracting that signal from the signal representing the apparent angle of attack;

summing the signals to thereby provide a signal which represents the yaw compensated angle of attack of the aircraft, and, providing a warning to a pilot when the yaw compensated angle of attack exceeds a predetermined value.

9. A yaw compensated angle of attack system comprising means including an angle of attack sensor for generating a signal which is indicative of an aircraft's apparent angle of attack, means including a transverse accelerometer for generating a signal which is indicative of the yaw angle of the aircraft, means for summing said signals to thereby produce a signal which indicates a yaw compensated angle of attack means for producing a signal which is indicative of the aircraft's rudder deflection and means for subtracting the rudder deflection signal from the signal which is indicative of the yaw compensated angle of attack, and means for warning a pilot when the yaw compensated angle of attack signal minus the rudder deflection signal exceeds a predetermined value.

* * * * *